United States Patent [19]

Shimauchi et al.

[11] 4,044,239
[45] Aug. 23, 1977

[54] METHOD AND APPARATUS FOR ADJUSTING VIBRATION FREQUENCY OF VIBRATING OBJECT

[75] Inventors: Minoru Shimauchi, Hamamatsu; Takashi Onoda, Hamakita, both of Japan

[73] Assignee: Nippon Gakki Seizo Kabushiki Kaisha, Hamamatsu, Japan

[21] Appl. No.: 661,020

[22] Filed: Feb. 24, 1976

[30] Foreign Application Priority Data

Feb. 28, 1975  Japan .................... 50-25330
Mar. 4, 1975   Japan .................... 50-25587

[51] Int. Cl.$^2$ .................... G10G 7/02; G05B 15/00
[52] U.S. Cl. .................... 235/151.3; 84/200; 84/455; 84/DIG. 18; 324/79 R
[58] Field of Search ...... 235/151.3; 84/200, DIG. 18, 84/454, 455; 324/79 R, 79 D, 78 Z, 80, 81; 58/23 TF, 23 V

[56] References Cited

U.S. PATENT DOCUMENTS

| | | | |
|---|---|---|---|
| 3,180,199 | 4/1965 | Anderson | 324/79 R |
| 3,472,116 | 10/1969 | Schott | 84/454 |
| 3,631,756 | 1/1972 | Mackworth-Young | 84/DIG. 18 |
| 3,881,389 | 5/1975 | Allen | 84/454 |
| 3,968,719 | 7/1976 | Sanderson | 324/79 R |

OTHER PUBLICATIONS

Van Der Wuerd; "New Electronic Tuning Device for Pianos"; J.A.S.A. - vol. 51, No. 6 (part 2); 1972; pp. 2010-2017.

Primary Examiner—Malcolm A. Morrison
Assistant Examiner—Errol A. Krass
Attorney, Agent, or Firm—Cushman, Darby & Cushman

[57] ABSTRACT

A method and an apparatus for adjusting the vibration frequency of vibrating objects such as piano strings, by stepwise adjustment of the vibration frequency of a vibrating object. The amount of the required adjusting operation in each of the adjustment steps is calculated by the equation:

$$\Delta\theta_i = K_i(f_s - f_{pi-1})$$

wherein:
$i$ represents an integer such as 1, 2, 3, ...;
$\Delta\theta_i$ represents the amount of adjustment in the i-th adjusting step;
$f_{pi-1}$ represents the vibration frequency after the (i−1)th adjusting step;
$K_i$ represents the constant employed in the calculation of the i-th adjusting step;
the constant ($K_1$) for the initial (i=1) adjusting step is predetermined; and
the constant $K_i$(i=2, 3, ...) for the second and subsequent adjusting steps is calculated by the equation:

$$K_i = \frac{\Delta\theta_{i-1}}{f_{pi-1} - f_{pi-2}}$$

wherein:
$\Delta\theta_{i-1}$ represents the amount of adjustment in the (i-1)th adjusting step;
$f_{pi-2}$ represents the vibration frequency after the (i-2)th adjusting step.

The vibration body needs to be kept vibrating only for the period of time required for the measurement of the vibration frequency in each adjusting step. This method and the apparatus is applicable to vibrating objects such as the strings of piano whose vibration amplitude undergoes rapid attenuation.

8 Claims, 4 Drawing Figures

METHOD AND APPARATUS FOR ADJUSTING VIBRATION FREQUENCY OF VIBRATING OBJECT

BACKGROUND OF THE INVENTION a. Field of the Invention

The present invention concerns a method and an apparatus for adjusting the vibration frequency of vibrating objects, and more particularly it relates to a tuning system of musical instruments, chimes and the like.

b. Description of the Prior Art

Vibrating objects of musical instruments and the like are such that their vibration frequencies tend to undergo wide variation because of various conditions such as trifle dimensional errors of the vibrating objects developing at the time of their manufacture or uneven quality of the materials with which the vibrating objects are made or the conditions at the time the vibrating objects are assembled in musical instruments. Accordingly, in, for example, musical instruments wherein precision vibration frequencies are required of the vibrating objects, adjustment of the vibration frequencies of the vibrating objects, i.e. the so-called tuning operation, is necessarily conducted upon completion of the assemblage of each musical instruments. In particular, adjustment of the vibration frequencies or tuning of the strings of such musical instruments as piano requires to be conducted with a high precision. Such tuning has been done in the past by well-trained tuning experts.

Such known tuning, however, has been conducted by a tuning art which entirely relies upon the acoustic sense of the tuner who attends to the tuning of a musical instrument. For this reason, it has been difficult to always obtain musical instruments of equal quality.

Also, in the above-discussed conventional tuning operation, it has been difficult for a tuner to exercise his acoustic sense sufficiently by listening to just one decay sound of a string of a piano which is produced by a single percussion of this string. Therefore, it has been usual that the tuner proceeds on the tuning operation by striking a string many times repeatedly with a hammer. Thus, the tuning of, for example, a piano consumes a very lengthy period of time.

On the other hand, as a means for solving such problem of the conventional tuning art, there can be considered a method of tuning which is conducted by causing continued vibration of a vibrating object and by progressively bringing the vibration frequency of this vibrating object to agree with the reference frequency while carefully and steadily comparing these two. Such tuning method is relatively suitable for the tuning of such a vibrating object that can be vibrated continuously for a relatively lengthy period of time to permit tuning during this period of time. However, this tuning method is not suitable for the tuning of a vibrating object which does not allow one to obtain continuous vibration, for example, a musical instrument such as clarinet whose timing requires to be performed by taking out its tuning member, i.e. the reed portion, from the body of the instrument.

SUMMARY OF THE INVENTION

It is, therefore, a primary object of the present invention to provide a superior method and an apparatus for adjusting the vibration frequency of a vibrating object, such as the strings of a piano, which is difficult to be kept vibrating continuously for a prolonged period of time.

Another object of the present invention is to provide a method and an apparatus of the type described above, which is capable of conducting adjustment of the vibration frequency of a vibrating object within a short period of time.

Still another object of the present invention is to provide a method and an apparatus of the type described above, which is capable of making substantially automatic adjustment of the vibration frequency of a vibrating object.

These and other objects as well as the features and advantages of the present invention will become apparent by reading the following detailed statement of the present invention when taken in conjunction with the accompanying drawings.

DETAILED DESCRIPTION OF THE PREFERRED EMBODIMENT

Prior to explaining the present invention, description will hereunder be made on the relationship between the vibration frequency of the vibrating object and the amount of the adjusting operation exerted by the vibration frequency varying means.

As an example, consideration is given to a string of a piano. The vibration frequency $f$ of the string is expressed by the following equation:

$$f = \frac{n}{2l} \sqrt{\frac{T}{E}} (1 + \alpha) \tag{1}$$

wherein:
  $T$ represents the tension of the string;
  $E$ represents the weight for unit length of the string;
  $l$ represents a length of the string;
  $\alpha$ represents a factor due to the bending rigidity of the string; and
  $n$ represents a vibration degree which can be 1, 2, 3, . . .

From the Equation (1), it can be understood that the vibration frequency $f$ is of the relationship of a certain function relative to the tension T. In general, in order to change the vibration frequency of a vibrating object, it is the simplest as well as most practical to increase or decrease the tension of the vibrating object itself. Therefore, in a piano, it has been the general practice as the means for adjusting the vibration frequency of a string to use a rotatable member designed to reel one end of the string i.e. the so-called "tuning pin," to operate in such a way that the angle of rotation of this tuning pin, or in other words the amount of reeling of the string, is increased or decreased to vary the tension of the string to thereby adjust the vibration frequency of this string. Since the angle of rotation of the tuning pin is in substantially direct proportion with the tension of the string, it may be said that the vibration frequency of the string is in relation of a certain function relative to the angle of rotation of the tuning pin.

It should be noted, however, that the vibration frequency of the string does not undergo linear variation relative to the angle rotation of the tuning pin. Instead, the vibration frequency of the string undergoes non-linear variation as shown, for example, by the curve L in FIG. 2. Moreover, this curve L tends to fluctuate considerably depending on the individual strings. This fact makes it difficult to adjust the vibration frequency of such strings.

Figure 2:
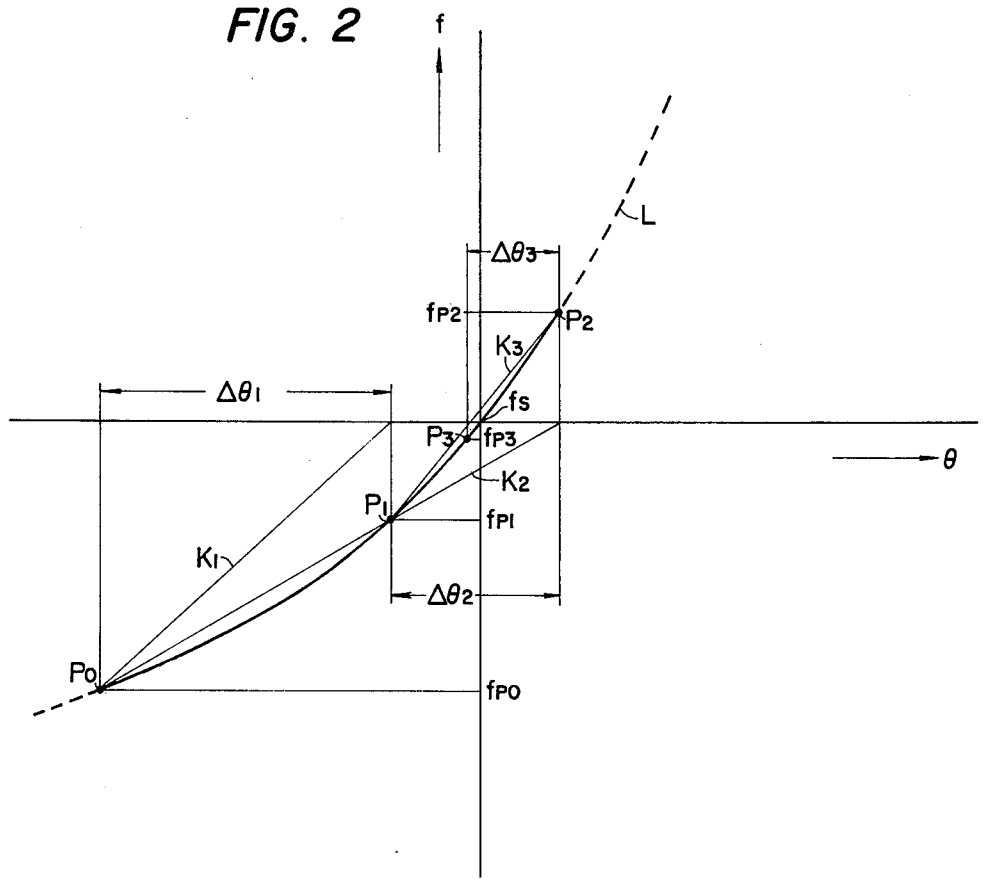
FIG. 2 is an illustration for explaining the entire vibration frequency adjusting process according to the method of the present invention.

However, as will be understood from FIG. 2, no apparent harm seems to arise from assuming that the minute variation of the vibration frequency of a string is in the relation of a linear function with the minute variation in the angle of rotation of the tuning pin.

The present invention has been worked out in view of the foregoing considerations. According to one aspect of the present invention, there is provided an improved method and apparatus for adjusting the vibration frequency which is capable of making an easy and swift adjustment of the vibration frequency of a vibrating object to bring it into agreement with a given reference vibration frequency. Another aspect of the present invention is to provide a method and an apparatus for carrying out automatic adjustment of the vibration frequency of a vibrating object.

According to the present invention, it is presumed that the increment of the angle of rotation of the tuning pin, i.e. generally speaking, the amount of adjusting operation exerted by the vibration frequency varying means, is in a direct proportion to the increment of the vibration frequency of a piano string which, in general, may be termed a "vibrating object." According to the method of the present invention, the adjustment of the vibration frequency is conducted stepwise. The required amount of adjusting operation exerted by the vibration frequency varying means is calculated from the result obtained in the immediately preceding adjusting step.

This calculation will hereunder be explained in terms of numerical formula. That is, the required amount $\Delta\theta$ of adjustment operation exerted by the vibration frequency varying means in each of the adjusting steps is calculated by the following equation:

$$\Delta\theta_i = K_i(f_s - f_{pi-1}) \ldots \qquad (2)$$

wherein:

$i$ represents an integer such as 1, 2, 3, ...;
$f_s$ represents the reference (aimed) vibration frequency;
$\Delta\theta_i$ represents the amount of adjusting operation for the $i$-th adjusting step;
$f_{pi-1}$ represents the vibration frequency after the $(i-1)$th adjusting step;
$K_i$ represents a constant which is calculated for the $i$-th adjusting step;
the constant $K_1$ for the initial ($i=1$) step is predetermined; and
the constant $K_i$ for the second and subsequent steps ($i=2, 3, 4, \ldots$) is calculated by the following equation:

$$K_i = \frac{\Delta\theta_{i-1}}{f_{pi-1} - f_{pi-2}} \qquad (3)$$

wherein:

$i = 2, 3, 4, \ldots$
$\Delta\theta_{i-1}$ represents the amount of adjusting operation for the $(i-1)$th 1)th adjusting step;
$f_{pi-2}$ represents the vibration frequency after the $(i-2)$th adjusting step.

Figure 1:
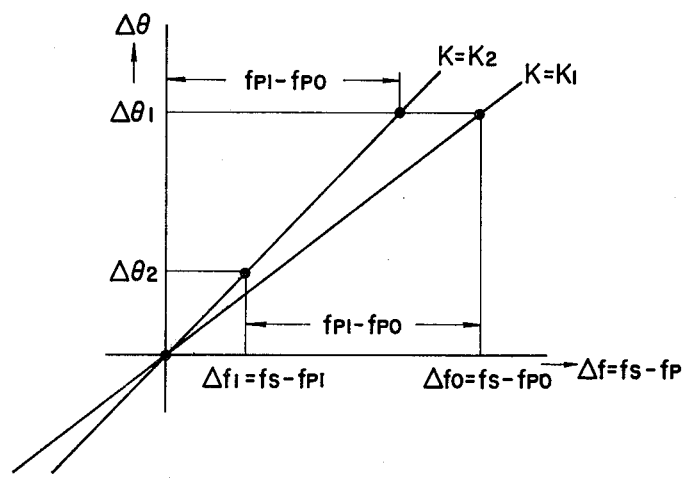
FIG. 1 is an illustration for explaining the variation of the constant which is used in the calculation of the required amount of adjusting operation in each of the vibration frequency adjusting steps.

The vibration frequency adjusting method according to the present invention which has been stated above will hereunder be described in a more concrete manner by referring to FIGS. 1 and 2.

First, the vibration frequency $f_{p0}$ wherein no adjustment has been conducted is measured first. The frequency deviation $\Delta f_o$ from the reference frequency $f_s$ is $f_s - f_{p0}$, which is to be adjusted toward zero. Then, the required amount $\Delta\theta_1$ of adjusting operation to be carried out by the vibration frequency varying means for the first ($i=1$) adjusting step is calculated by substituting a predetermined constant $K_1$ into Equation (2), as follows:

$$\Delta\theta_1 = K_1(f_s - f_{p0})$$

This calculation is explained graphically in FIG. 1.

In this first step, the vibration frequency varying means is operated by the amount $\Delta\theta_1$ obtained from the calculation made. Whereupon, as shown in FIG. 2, the point of vibration will move from point $P_0$ to point $P_1$ along frequency vibration curve L, so that the vibration frequency will become $f_{p1}$.

Then, using the result of the first adjusting step, there is sought the constant $K_2$ which is necessary for the calculation of the required amount $\Delta\theta_2$ of adjusting operation for the second adjusting step ($i=2$), as follows:

$$K_2 = \frac{\Delta\theta_1}{f_{p1} - f_{p0}}$$

This second calculation is illustrated in FIG. 1.

Using the constant $K_2$ thus obtained, the required amount $\Delta\theta_2$ of adjusting operation is calculated in accordance with the Equation (2), as follows:

$$\Delta\theta_2 = K_2(f_s - f_{p1})$$

More specifically, as will be understood from FIG. 2, it should be noted that, in the second adjusting step, assumption is made so that the vibration frequency varies along the extension of the rectilinear line connecting the point $P_0$ to the point $P_1$, and thus the required amount $\Delta\theta_2$ of the second adjusting operation is calculated.

When adjusting operation is carried out for $\Delta\theta_2$ in this second adjusting step, the point of vibration moves, in fact, from point $P_1$ to point $P_2$ along the curve L, and thus the vibration frequency will become $f_{p2}$.

In a similar way, there is sought a constant $K_3$ for the third adjusting step, as follows:

$$K_3 = \frac{\Delta\theta_2}{f_{p2} - f_{p1}}$$

Using this constant $K_3$, there is sought the required amount $\Delta\theta_3$ of adjusting operation, as follows:

$$\Delta\theta_3 = K_3(f_s - f_{p2})$$

As a result of this third adjusting step, the vibration frequency will become $f_{p3}$.

In this way, the vibration frequency of the vibrating object is adjusted stepwise so that it is brought closer to the reference (aimed) vibration frequency $f_s$.

In summary of the foregoing statement, the required amount $\Delta\theta_i$ of adjusting operation exerted by the vibration varying means in each of the adjusting steps is calculated by the following equation:

$$\Delta\theta_i = K_i(f_s - f_{pi-1}) \cdots \quad (2)$$

wherein:
  $i$ represents an integer such as 1, 2, 3, . . . ;
  $\Delta\theta_i$ represents the amount of adjusting operation for the $i$—th adjusting step;
  $f_{pi}$ represents the vibration frequency after the $i$—th adjusting step;
  $K_i$ represents the constant employed in the calculation of the amount of adjustment for the $i$—th adjusting step;
  the constant $K_1$ for the initial (=1) adjusting step is predetermined;
  the constant $K_i$ ($i=2, 3, \ldots$) for the second and subsequent step is calculated by the following equation:

$$K_i = \frac{\Delta\theta_{i-1}}{f_{pi-1} - f_{pi-2}} \quad (3)$$

The foregoing adjusting steps continue until the difference between the vibration frequency and the reference frequency is smaller than a certain permissible frequency error set separately.

Description will next be made, by referring to FIG. 3, on the method of the present invention for automatically adjusting the vibration frequency of a vibrating object and on an example of the apparatus for practicing this mode. It should be understood that this example is explained as an instance where the present invention is applied to the tuning of a piano. It should be understood, however, that the present invention can be applied equally effectively to musical instruments other than pianos.

Figure 3:
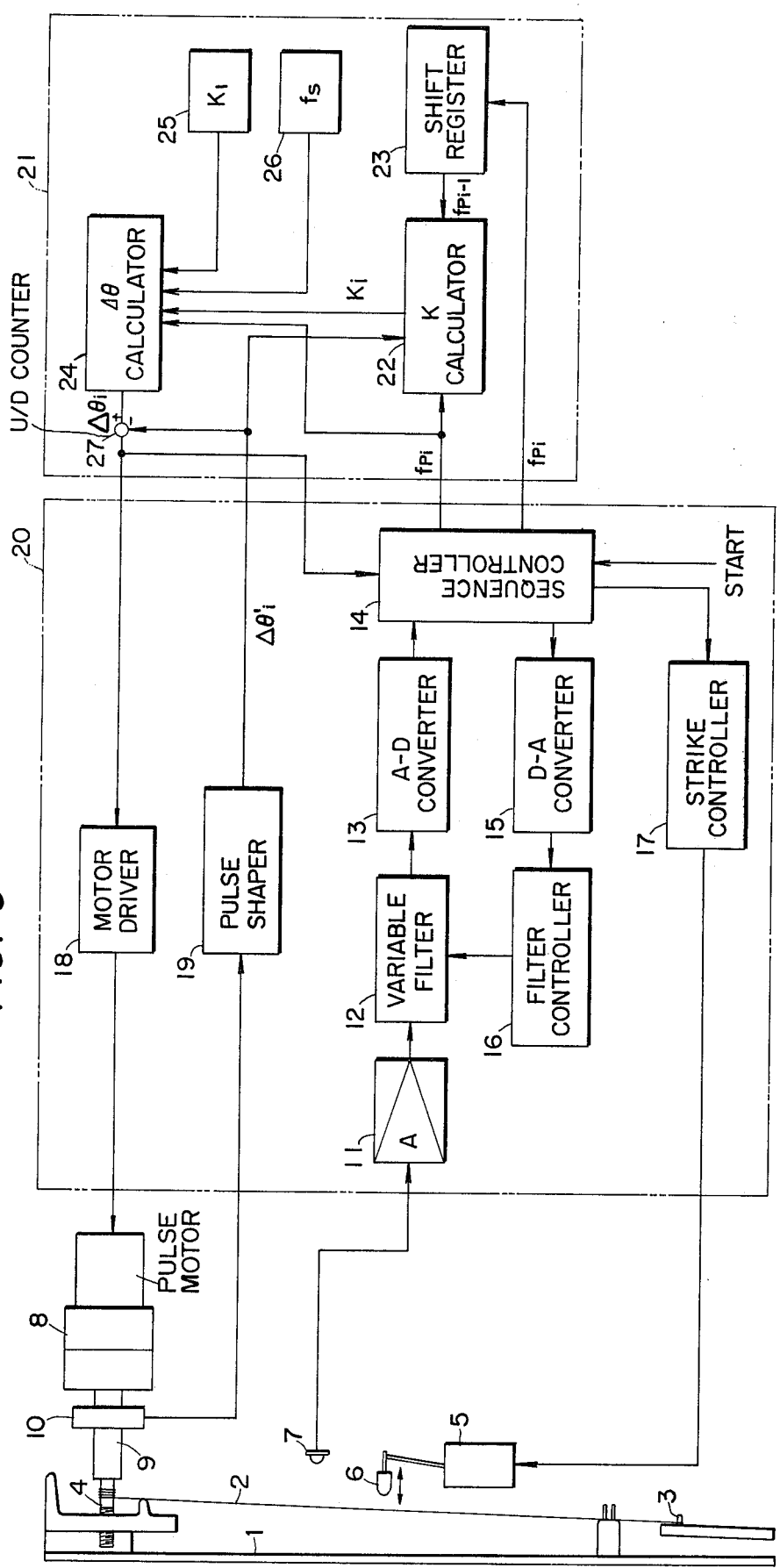
FIG. 3 is a block diagram showing an example of the apparatus of the present invention.

In FIG. 3, reference numeral 1 represents a sounding board of a piano. 2 represents a string, one end of which is fixed to a hitch pin 3 and the other end is fixed by being wound around a tuning pin 4 which is rotatably provided at one end of the sounding board 1. The adjustment of the vibration frequency of the string 2 is carried out by rotating this tuning pin 4 and thus altering the amount of reeling the string and thus by varying the tension applied to the string 2. Each of the above-mentioned elements is provided on the pianos in general. Numeral 5 represents a string-striking means which comprises a hammer 6 for striking the string 2. A microphone 7 detects the vibration (sound) of the string 2 as it is struck by the hammer 6 and converts this vibration to an electric signal of vibration. Numeral 8 represents a drive motor for driving a pin driver 9 which is mounted on the tuning pin 4. In this instant example, a pulse motor is employed as the drive motor. Numeral 10 represents a sensor for detecting the rotation of the pin driver 9. This sensor 10 generates a signal for each predetermined angular rotation of the pin driver 9.

Numeral 20 represents a control unit, and numeral 21 represents a numerical calculating unit.

The control unit 20 comprises an amplifier 11, a variable filter 12, an A – D (Analog to Digital) converter 13, a sequence controller 14, a D – A (Digital to Analog) converter 15, a filter controller 16, a string-strike controller 17, a motor driver 18 and a pulse shaper 19.

The calculating unit 21 comprises a constant calculator 22, a one-stage shift register (memory or delay means) 23, an adjusting amount calculator 24, an initial constant setter 25, a reference vibration frequency setter 26 and an up-down counter 27.

Description will next be made on the action of the apparatus of this instant example and the details of the respective constituting elements of this apparatus.

Using the reference vibration frequency setter 26, the reference vibration frequency $f_s$ of the string whose vibration frequency is intended to be adjusted is set. Along with this, the initial constant $K_1$ is set by the initial constant setter 25.

After the preparation for adjustment is thus completed, an adjustment start signal is applied to the sequence controller 14. Whereupon, a string-striking signal is transmitted from the sequence controller 14 to the string-strike controller 17. Upon receipt of this signal, the hammer 6 of the string-striking means 5 is actuated so that the hammer 6 strikes the string 2. The vibration of the string 2 thus caused is converted to an electrical signal by the microphone 7. This electric signal is transmitted, via the amplifier 11 and the variable filter 12, to the A – D converter 13. Thus, a digital signal corresponding to the vibration frequency of the string 2 is inputted to the sequence controller 14. This sequence controller 14 has a digital counter (frequency counter). This sequence controller 14, upon receipt of the digital signal, generates a signal corresponding to the vibration frequency of the string 2, for example, a binary coded signal, to be transmitted to the numerical calculating unit 21.

The pass-band frequency of the variable filter 12 is understood to be automatically adjusted so as to pass therethrough a signal corresponding to the reference vibration frequency $f_s$ of the string 2 or a signal in the vicinity of the vibration frequency of a harmonic of said reference vibration frequency $f_s$. In other words the vibration frequency of the string 2 prior to being adjusted is usually not much departed from the reference vibration frequency. Accordingly, so long as the pass-band frequency of the variable filter 12 has been already adjusted as stated above, the vibration signal will be passed through this variable filter 12 to be transmitted to the A – D converter 13 through the entire adjusting process of the vibration frequency of a given string 2.

The adjustment of said pass-band frequency of the variable filter 12 is carried out in the following manner.

In the event that a vibration signal from the initial striking of the string is not inputted to the A – D converter 13, and in case, accordingly, the counter housed in the sequence controller 14 is unable to count the vibration frequency, a filter control signal (a digital signal) is generated from the sequence controller 14. This digital signal is converted to an analog signal by the D – A converter 15 to be applied to the filter controller 16. Whereby, the pass-band frequency of the variable filter 12 is adjusted. Right after this adjustment has been made, a string-strike signal is generated from the sequence controller 14, and the string 2 is struck again. In the event that no vibration signal is passed through the variable filter 12 even by this second striking on the string 2, the above-mentioned adjusting operation is repeated.

In case the variable filter 12 has been adjusted normally (meaning: adjusted so as to allow the passage therethrough of the vibration signal), a vibration frequency signal $f_{p0}$ is transmitted from the sequence controller 14 to the constant calculator 22 of the calculating unit 21, the shift register 23 and the adjusting amount calculator 24 in this order. This, the initial (first) adjusting step of vibration frequency is materialized. In this initial step, the shift register 23 does not generate its output. Therefore, the constant calculator 22 does not carry out the calculation of a constant. As a result, the adjusting amount calculator 24 calculates the required adjusting amount $\Delta\theta_1$, in accordance with the Equation (2), from the vibration frequency signal $f_{p0}$ (vibration frequency prior to being adjusted) and from both the reference vibration frequency signal $f_s$ (reference vibration frequency) generated from the reference vibration frequency setter 26 and the output $K_1$ (initial constant) of the initial constant setter, as follows:

$$\Delta\theta_1 = K_1 (f_s - f_{p0})$$

The output of the adjusting amount calculator 24 is a digital signal corresponding to said $\Delta\theta_1$, for example, it is a binary coded signal. This is inputted to the up-input terminal of the up-down counter 27. This up-down counter 27 continuously outputs one pulse for each decrease of one count from its count value until this count value reaches zero. The motor driver 18, upon receipt of the output of the up-down counter 27, drives the pulse motor 8. The rotation angle detector 10 generates a pulse for each predetermined angular rotation. This output pulse, after being shaped of its waveform by the pulse shaper 19, is inputted to the down-input terminal of the up-down counter 27. Thus, when the pin driver 9, and accordingly the tuning pin 4, has been rotated through an angle corresponding to $\Delta\theta_1$, the updown counter 27 is set to zero, thereby halting the drive of the pulse motor 8. As a result, the pulse shaper 19 will no longer generate a pulse.

The sequence controller 14, upon its detection of the cease of output from the pulse shaper 19, will detect the completion of the performance of the first (initial) adjusting step, and along with this the sequence controller 14 will transmit a string-strike signal to the string-strike controller 17 to cause a striking on the string to carry out the second adjusting step. Due to this striking on the string, the sequence controller 14 will generate a vibration frequency signal $f_1$ (vibration frequency following the first adjusting step) to be transmitted to the constant calculator 22, the shift registor 23 and the adjusting amount calculator 24 in this order. The shift register 23, in turn, stores the vibration frequency signal $f_{p1}$ and at the same time it shifts out the information $f_{p0}$ which has been stored therein at the time of the initial adjusting step. The constant calculator 22, using the adjusting amount $\Delta\theta_1$ obtained in the initial step, calculates the constant $K_2$ in accordance with the Equation (3) and outputs it. This constant calculator 22 has a memory (REGISTER) for storing that adjusting amount of the immediately preceding step upon receipt of the output of the pulse shaper 19. The adjusting amount calculator 24, using the vibration frequency $f_{p1}$, the reference vibration frequency $f_s$ and the calculated constant $K_2$, calculates the adjusting amount $\Delta\theta_2$ in accordance with the Equation (2), as follows:

$$\Delta\theta_2 = K_2 (f_s - f_{p1})$$

This adjusting amount calculator 24 has an input signal inhibiting circuit which, upon receipt of the output of the constant calculator 22, inhibits the intake of the output of the initial constant setter 25.

The adjusting steps are repeated in the manner as stated above. When, thus, the difference between the vibration frequency $f_{pi}$ of the string 2 and the reference vibration frequency $f_s$ is narrowed to be within the permissible error x, the adjusting process comes to a halt. Vigilance of this difference between $f_s$ and $f_p$ can be performed by, for example, detecting the output of the adjusting amount calculator 24.

Figure 4:
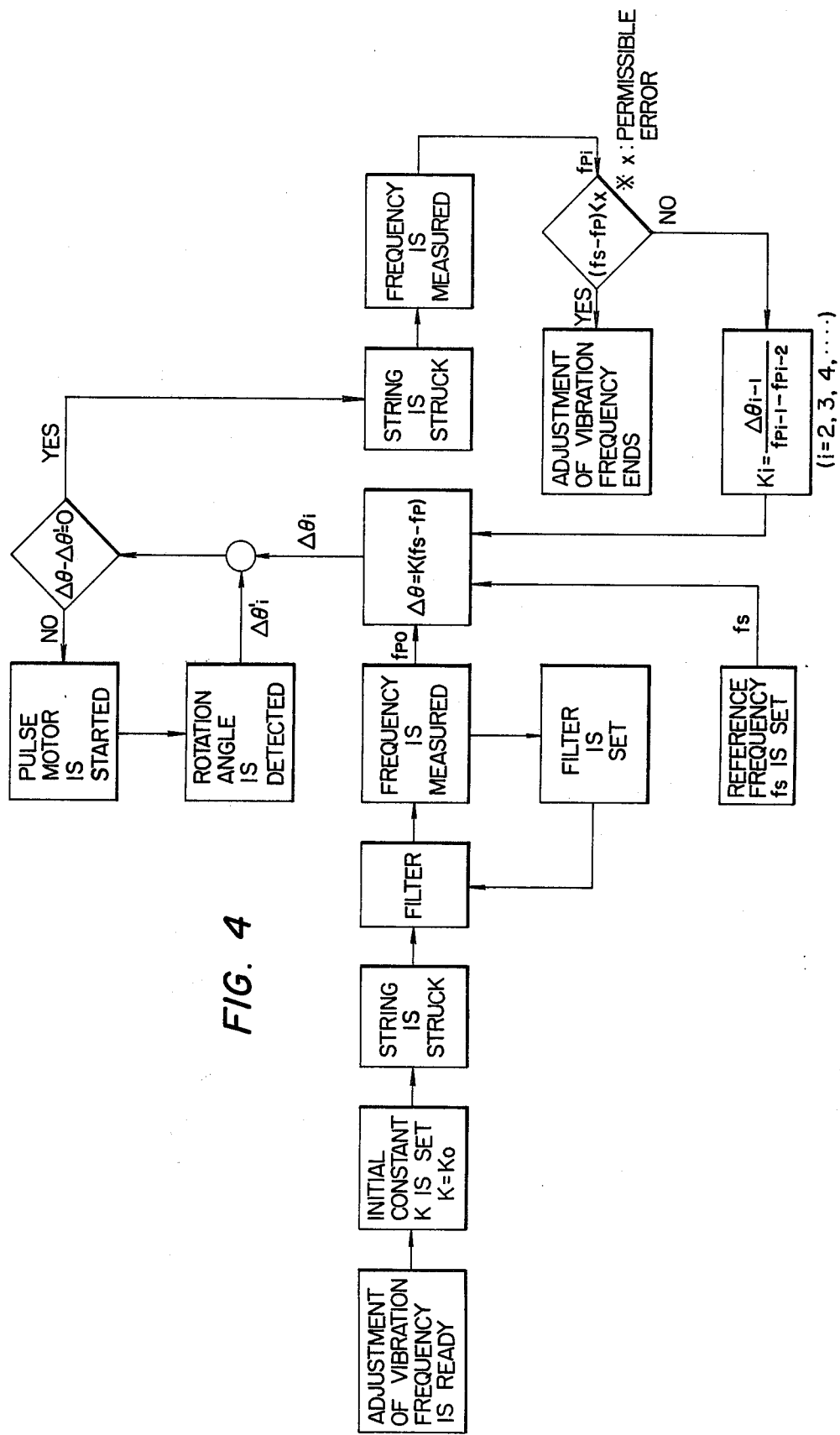
FIG. 4 is a flow chart showing the action of the apparatus shown in FIG. 3.

The flow chart of FIG. 4 will be useful in understanding the above-stated adjusting process. This chart is self-explanatory.

Description has been made on an instance wherein, as the vibrating object driving unit for causing vibration of the vibrating object, a string-striking means designed to produce vibration of the string by striking same is employed. It should be understood that the present invention is not limited thereto, and that some other means of causing vibration by, for example, relying on a magnetical method such as by the use of an electromagnet, may be employed. Also, in the above-stated example, the vibration frequency of the vibrating object is detected by the use of a microphone. It is, however, needless to say that an equally effective result can be obtained from the use of some other sensors.

Furthermore, in the above-stated example, the rotation of the tuning pin for the adjustment of the vibration frequency of the vibrating object is caused by a pulse motor and also the control of this motor is performed by a closed loop control system. It should be understood that, in place of this pulse motor, there may be used a servo motor, and that there is no need to rely particularly on the closed loop control system but that an open loop control system may be employed for the control of the servo motor.

Still further, in the above-stated example, most of the signals used in the calculating units and the control units are digital signals. However, the respective parts may be arranged so that all of these parts handle only analog signals.

We claim:

1. A method for conducting stepwise adjustment of the vibration frequency of a vibrating object by operating a vibration frequency varying means connected to said vibrating object to make said vibration frequency of said vibrating object substantially equal to a reference frequency, comprising the steps of:
   a. measuring the vibration frequency of said vibrating object;
   b. operating said vibrating frequency varying means by an increment to cause the vibrating frequency to change and measuring the resulting vibration frequency of the vibrating object;
   c. stopping the operating step whenever the difference between said resulting vibration frequency measured in a preceding step of operating and the reference frequency is smaller than a certain predetermined permissible frequency error;

d. continuing to operate, whenever said difference is not smaller than said certain permissible frequency error, said vibration frequency varying means to cause the vibrating frequency to successively change by a present increment determined by: the past increment in the immediately prior step of operating, the frequency representing the difference between the vibration frequencies of the vibrating object before and after said immediately prior step of operating said vibration frequency varying means, and the frequency deviation representing that frequency difference relative to the reference frequency still remaining after the immediately prior step of operating; and e. repeating steps (c) through (d) until the vibration frequency of the vibrating object becomes substantially equal to the frequency.

2. A method according to claim 1, in which: said increment in step (b) is determined by a mathematical calculation according to the following equation:

$$\Delta\theta_1 = K_1(f_s - f_{p0})$$

wherein:

$\Delta\theta_1$ represents said increment of step (b);

$K_1$ represents a constant predetermined in accordance with the vibrating object;

$f_s$ represents said reference frequency; and $f_{p0}$ represents said measured vibration frequency in step (a).

3. A method according to claim 1, in which: said present increment of step (d) is determined by a mathematical calculation according to the following equation:

$$\Delta\theta_i = \frac{\Delta\theta_{i-1}}{f_{pi-1} - f_{pi-2}} (f_s - f_{pi-1})$$

wherein:

$\Delta\theta_1$ represents the increment of the present operating step;

$\Delta\theta_{i-1}$ represents the past increment of the immediately prior step of operating;

$f_{pi-1}$ represents the resulting vibration frequency after the immediately prior step of operating;

$f_{pi-2}$ represents the resulting vibration frequency after the step of operating immediately prior to the present step of operating; and $f_s$ represents the reference frequency.

4. An apparatus for conducting stepwise adjustment of the vibration frequency $f_p$ of a vibrating object to make said vibration frequency $f_p$ substantially equal to a reference frequency $f_s$ through an adjusting process consisting of a number $i$ of steps of operating a vibration frequency varying means through the increments $\Delta\theta_1$ which are calculated in accordance with the equation:

$$\Delta\theta_i = K_i(f_s - f_{pi-1}) \ldots \quad (1)$$

wherein:

$i$ represents an integer indicating the number of a given operating step;

$\Delta\theta_i$ represents the increment to be carried out by said vibration frequency varying means in the $i$—th operating step;

$f_{pi-1}$ represents the resulting vibration frequency in the $(i-1)$th operating step;

$K_i$ represents the constant employed in the calculation of the $i$—th operating step;

the constant $K_1$ for the first ($i=1$) adjusting step being predetermined;

the constant $K_i (i=2, 3, \ldots)$ for the second and subsequent adjusting steps being calculated in accordance with the equation:

$$K_i = \frac{\Delta\theta_{i-1}}{f_{pi-1} - f_{pi-2}} \quad (2)$$

wherein:

$\Delta\theta_{i-1}$ represents the increment to be carried out by said vibration frequency varying means in the $(i-1)$th operating step;

$f_{pi-1}$ represents the resulting vibration frequency in the $(i-1)$th operating step;

$f_{pi-2}$ represents the resulting vibration frequency in the (1-2)th operating step;

said apparatus comprising:

means for causing vibration of said vibrating object;

means for detecting said vibration of said vibrating object;

control means for, upon receipt of the output of said detecting means measuring the vibration frequency of the vibrating object, generating a signal corresponding toa the measured vibration frequency, upon receipt of an external start signal prior to conducting said first ($i=1$) adjusting step, actuating said vibration-causing means to cause vibration of said vibrating object and, thereafter, detecting the end of each operation to actuate said vibration-causing means;

a calculating unit including means for setting said reference vibration frequency $f_s$ and said first constant $K_1$, $K_i$ calculating means for, upon receipt of the aforesaid signal generated from said control means and corresponding to said measured vibration frequency, calculating the constant $K_i (i=2, 3, \ldots)$ for the second ($i=2$) and subsequent ($i=3, 4, \ldots$) operating steps in accordance with equation (2), and $\Delta\theta_i$ calculating means for calculating in accordance with equation (1) that increment for the respective operating steps ($i=1, 2, 3, \ldots$); and operating means which, upon receipt of the output of the $\Delta\theta_i$ calculating means of said calculating unit, operates the vibration frequency varying means through an amount $\Delta\theta_i$ calculated by said $\Delta\theta_i$ calculating means, said operating process being stopped whenever the difference between the resulting vibration frequency in the nearest prior operating step and said referency frequency is smaller than a predetermined permissible frequency error set error.

5. An apparatus according to claim 4, in which: said $K_i$ calculating means includes:

a delay means for delaying the signal generated from said control means and corresponding to said measured vibration frequency, so that said signal is generated with a delay corresponding to the period of one operating step; and said $\Delta\theta_i$ calculating means includes a $\Delta\theta_i$ calculator which, upon receipt of said signal generated from said control means and corresponding to said measured vibration frequency, and the output signal $\Delta\theta_{i-1}$ of said $\Delta\theta_i$ calculating means in the immediately prior operating step, calculates in accordance with said equation (2) the constant $K_i$ for the second ($i=2$) and subsequent ($i=3, 4, \ldots$) operating steps.

6. An apparatus according to claim 4, further including means connected to the inputs of said $\Delta\theta_i$ calculating means for supplying:
   1. the signal generated from said control means and corresponding to said meansured vibration frequency;
   2. the output of said vibration frequency setting means;
   3. the output of said $K_i$ calculating means; and
   4. the output of the $K_i$ setting means, said $\Delta\theta_i$ calculating means includes means for inhibiting the supplying of the output of said $K_1$ setting means in the second and subsequent operating steps.

7. An apparatus according to claim 4, in which: the operating means includes:
   a pulse motor for operating said vibration frequency varying means;
   an operating increment detecting means for detecting the increment of the vibration frequency varying means; and
   comparing means which, upon receipt of the output of said $\Delta\theta_i$ calculating means and the output of said operating amount detecting means, compares the operating amount $\Delta\theta_i$ calculated by said $\Delta\theta_i$ calculating means with the actual operating amount $\Delta\theta'_i$ exerted by said vibration frequency varying means and continuously generates a drive signal to said pulse motor until the two amounts $\Delta\theta_i$ and $\Delta\theta'_i$ come into agreement with each other.

8. An apparatus according to claim 7, in which:
   said operating increment detecting means generates pulses the number of which are proportional to the operating increment of said vibration frequency varying means;
   said comparing means includes an up-down counter which continuously generates one pulse for each decrease of one count from a stored count until the count becomes zero;
   the drive signal for the pulse motor is generated from said comparing means based on the output of said up-down counter; and
   the output of said operating increment detecting means is applied as an input to the down-count input terminal of said up-down counter, and the output of said $\Delta\theta_i$ calculating means is applied as an input to the up-count input terminal of said up-down counter.

* * * * *